United States Patent [19]

Kodera

[11] Patent Number: 5,646,704
[45] Date of Patent: Jul. 8, 1997

[54] CHIRAL SMECTIC LIQUID CRYSTAL DEVICE HAVING PREDETERMINED PRE-TILT ANGLE AND INTERSECTION ANGLE

[75] Inventor: Yasuto Kodera, Fujisawa, Japan

[73] Assignee: Canon Kabushiki Kaisha, Tokyo, Japan

[21] Appl. No.: 373,539

[22] Filed: Jan. 17, 1995

Related U.S. Application Data

[63] Continuation of Ser. No. 42,526, Apr. 5, 1993, abandoned, which is a continuation-in-part of Ser. No. 7,005, Jan. 21, 1993, abandoned, which is a continuation of Ser. No. 603,376, Oct. 26, 1990, abandoned.

[30] Foreign Application Priority Data

Oct. 26, 1989 [JP] Japan ..................... 1-277028

[51] Int. Cl.⁶ ..................... G02F 1/1337; G02F 1/141
[52] U.S. Cl. ..................... 349/134; 349/2; 349/135; 349/172
[58] Field of Search ..................... 359/75, 54, 76, 359/56, 77, 78, 90, 100; 355/210, 214, 228, 229; 345/87

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,566,758 | 1/1986 | Bos | 359/75 |
| 4,589,996 | 5/1986 | Inoue et al. | 252/299.65 |
| 4,591,886 | 5/1986 | Umeda et al. | 346/160 |
| 4,592,858 | 6/1986 | Higuchi et al. | 252/299.66 |
| 4,596,446 | 6/1986 | Waters et al. | 359/55 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,622,165 | 11/1986 | Kano et al. | 252/299.65 |
| 4,662,721 | 5/1987 | Harada et al. | 359/76 |
| 4,778,259 | 10/1988 | Kitayama et al. | 359/76 |
| 4,781,439 | 11/1988 | Yokokura et al. | 359/75 |
| 4,783,149 | 11/1988 | Umeda et al. | 359/56 |
| 4,832,462 | 5/1989 | Clark et al. | 359/78 |
| 4,836,653 | 6/1989 | Yoshino et al. | 359/76 |
| 4,879,059 | 11/1989 | Hanyu et al. | 359/75 |
| 4,900,132 | 2/1990 | Bos | 359/75 |
| 4,902,106 | 2/1990 | Dijon et al. | 359/75 |

(List continued on next page.)

FOREIGN PATENT DOCUMENTS

| | | | |
|---|---|---|---|
| 286539 | 10/1988 | European Pat. Off. | |
| 192724 | 8/1987 | Japan . | |
| 2004224 | 1/1990 | Japan | 359/74 |
| 6020 | 10/1987 | WIPO . | |

OTHER PUBLICATIONS

N. Yamamoto et al "Ferroelectric Liquid Crystal Display with High Contrast" Jap. Journal of Applied Physics–vol. 28–No. 3–Mar. 1989–pp. 524–529.

Scheuble, Seminar Lecture Notes, SID, vol. 2 (9189) 12.2–.18.

Uemura, Jap. Disp. 86, Proc. 6th Int. Disp. Res. Conf. (1986) 464–7.

Clark, App. Phys. Lett., vol. 36, No. 11 (1980) 899; 901.

*Primary Examiner*—William L. Sikes
*Assistant Examiner*—Tai V. Duong
*Attorney, Agent, or Firm*—Fitzpatrick, Cella, Harper & Scinto

[57] ABSTRACT

A liquid crystal device is formed by disposing a chiral smectic liquid crystal between a pair of substrates, each having thereon a group of electrodes for driving the chiral smectic liquid crystal and an alignment control film comprising a fluorine-containing polyimide provided with a uniaxial rubbing axis such that the uniaxial alignment axes provided to the pair of substrates intersect each other at a prescribed intersection angle. In the device, the liquid crystal molecules are aligned to provide a director forming a pre-tilt angle with the polyimide film surfaces of the substrates, whereby formation of splay alignment state in the chiral smectic liquid crystal molecules is suppressed. The liquid crystal device provides an improved contrast and also a broad drive margin.

6 Claims, 9 Drawing Sheets

U.S. PATENT DOCUMENTS

| | | | |
|---|---|---|---|
| 4,952,032 | 8/1990 | Inoue et al. | 359/56 |
| 4,997,264 | 3/1991 | Coulson | 359/49 |
| 5,005,953 | 4/1991 | Kawagishi | 359/78 |
| 5,016,989 | 5/1991 | Okada | 359/63 |
| 5,111,318 | 5/1992 | Kotoh et al. | 359/76 |
| 5,192,596 | 3/1993 | Hanyu et al. | 359/75 |
| 5,268,780 | 12/1993 | Hanyu et al. | 359/78 |
| 5,270,846 | 12/1993 | Watanabe et al. | 359/74 |
| 5,293,544 | 3/1994 | Hanyu et al. | 359/78 |
| 5,321,537 | 6/1994 | Okada et al. | 359/78 |
| 5,325,219 | 6/1994 | Hanyu et al. | 359/78 |
| 5,331,081 | 7/1994 | Dübal et al. | 359/78 |
| 5,347,381 | 9/1994 | Shinomiya et al. | 359/78 |

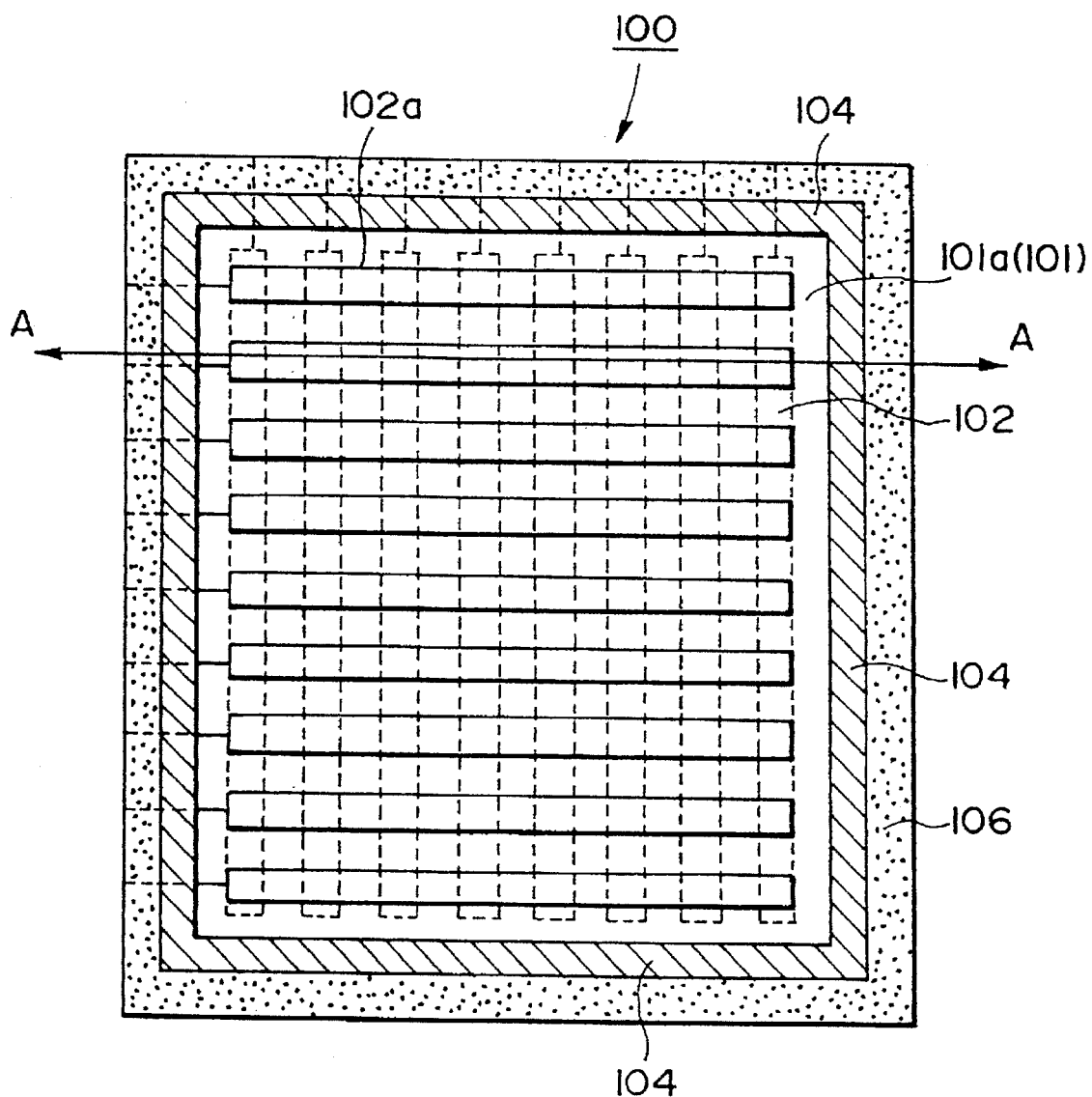
F I G. 2

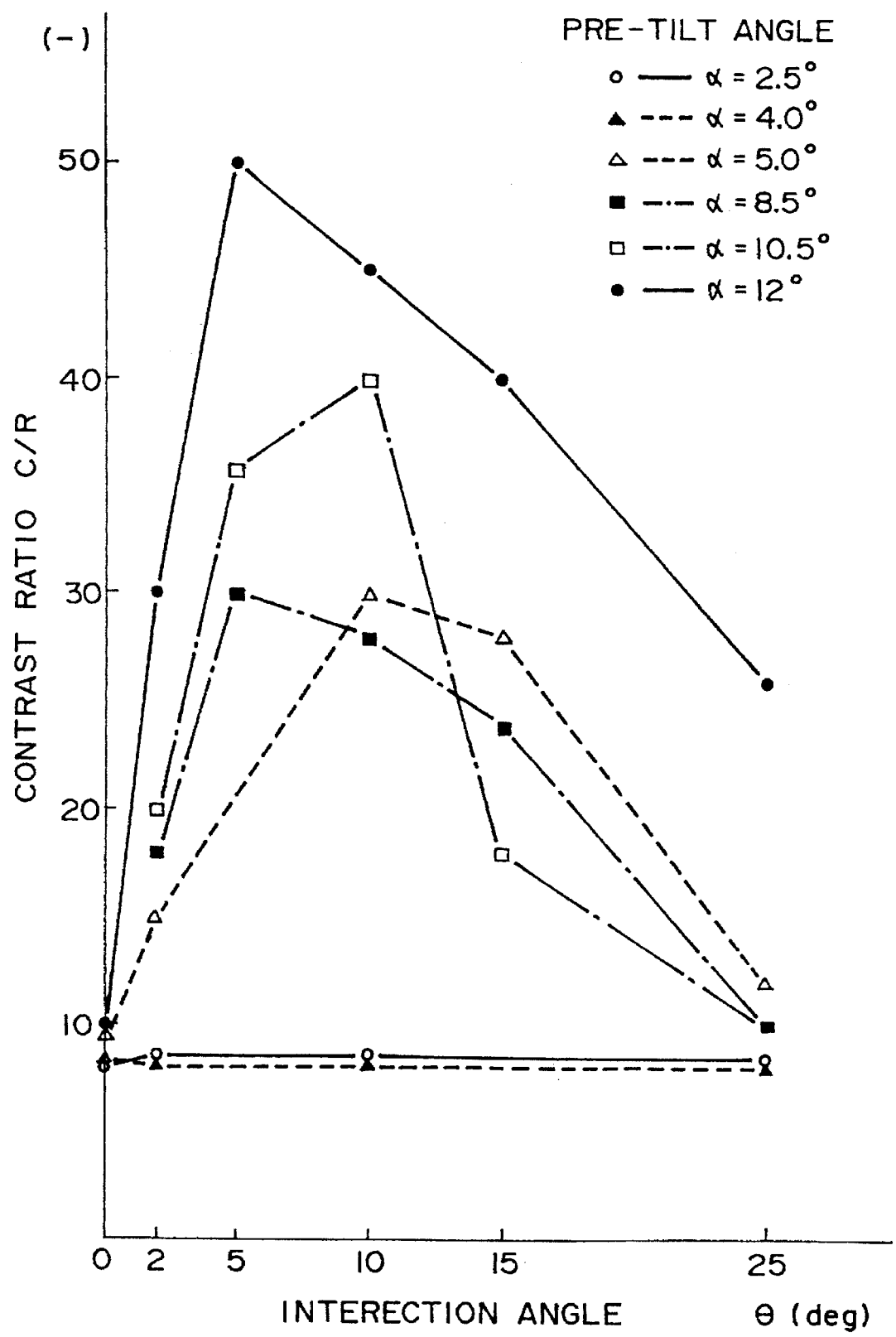
F I G. 7

CHIRAL SMECTIC LIQUID CRYSTAL DEVICE HAVING PREDETERMINED PRE-TILT ANGLE AND INTERSECTION ANGLE

CROSS-REFERENCE TO RELATED APPLICATIONS

This application is a continuation of application Ser. No. 08/042,526, filed Apr. 5, 1993, now abandoned, which is, in turn a continuation-in-part of application Ser. No. 08/007, 005, filed Jan. 21, 1993, now abandoned, which is, in turn a continuation of application Ser. No. 07/603,376, filed Oct. 26, 1990, now abandoned.

FIELD OF THE INVENTION AND RELATED ART

The present invention relates to a liquid crystal device using a ferroelectric liquid crystal which can be incorporated in an image display apparatus, a recording apparatus, etc.

Clark and Lagerwall have proposed a liquid crystal device showing bistability (U.S. Pat. No. 4,367,924, etc.). As the liquid crystal showing bistability, a ferroelectric liquid crystal assuming chiral smectic C phase (SmC*) or H phase (SmH*). The ferroelectric liquid crystal assumes bistable states including a first optically stable state and a second optically stable state depending on the electric field thereto. Accordingly, as different from a TN-type liquid crystal used in a conventional optical modulation device, the liquid crystal is oriented to a first optically stable state in response to one electric field vector, and is oriented to a second optically stable state in response to the other electric field vector, for example. Further, this type of liquid crystal has properties of quickly responding to an applied electric field to assume either one of the above-mentioned two stable states and retaining the resultant state in the absence of an electric field. When a liquid crystal device is constituted by using a ferroelectric liquid crystal showing such properties, it is possible to obtain substantial improvements to many problems inclusive of poor viewing angle characteristic involved in a conventional TN-type device.

In a ferroelectric liquid crystal device showing bistability realized heretofore, however, a satisfactorily uniform alignment state of liquid crystal has not been always formed. Further, in a liquid crystal device having a small pre-tilt angle (less than 5 degrees), the tilt angle of the liquid crystal in chiral smectic phase is on the order of at most 8 degrees. While the tilt angle, being smaller than 22.5 degrees, provides transmittance, it fails to provide sufficient contrast. On the other hand, in an liquid crystal device having a large pre-tilt angle ($\geq 5$ degrees), there occur 4 alignment states including two states (uniform alignment states) providing a high contrast and other two states (splay alignment states) providing a low contrast, so that a large contrast cannot be obtained as desired in some cases. Further, in case of the pre-tilt angle being 35 degrees or larger, the difference in directions regulated by the alignment films on a pair of substrates is too large so that the alignment axes of liquid crystal are liable to be separated into one in a region regulated by one substrate and another in a region regulated by the other substrate, thus failing to provide an increased contrast.

Further, during a drive under application of constant voltages, it is possible to fail in providing a bright-dark display over the entirety or a part of the display region. According to my study, it has been found that the above failure of a bright-dark display is caused by a local difference in threshold voltage due to irregularity in cell thickness and/or a change in threshold voltage due to temperature change over the entirely or a part of the display area. The bright-dark display can be stabilized over the entire display area by changing the applied voltage waveform but another problem can be caused thereby due to narrowing of the drive margin to result in a lower contrast.

SUMMARY OF THE INVENTION

An object of the present invention is to provide a liquid crystal device that solves the above-mentioned problems.

A more specific object of the present invention is to provide a liquid crystal device including a ferroelectric liquid crystal disposed in a uniform alignment state showing bistability and a large pre-tilt angle, in which device the occurrence of two states providing a low contrast is prevented to stabilize the uniform alignment state giving a high contrast, thus resulting in an improved, and the drive margin is increased to provide a satisfactory bright-dark display under wide driving conditions.

According to the present invention, there is provided a liquid crystal device, comprising a pair of substrates and a chiral smectic liquid crystal disposed between the substrates, each substrate having thereon a group of electrodes for driving the chiral smectic liquid crystal and an alignment control film comprising a fluorine-containing polyimide provided with a uniaxial rubbing axis such that the uniaxial alignment axes provided to the pair of substrates intersect each other at a prescribed intersection angle, wherein the liquid crystal molecules are aligned to provide a director forming a pre-tilt angle with the polyimide film surfaces of the substrates, whereby formation of splay alignment state in the chiral smectic liquid crystal molecules is suppressed.

In the liquid crystal device of the present invention as described above, the uniaxial alignment axes provided to the pair of substrates intersect at a certain intersection angle ($\theta$) and the pre-tilt angle between the direction of liquid crystal molecules and the liquid crystal alignment surfaces is 5 degrees or larger, whereby the occurrence of a splay alignment is suppressed to provide a good alignment characteristic of the liquid crystal, thus providing a high contrast. Further, as the drive margin is increased, a bright-dark display over wide drive conditions to provide a stable display which is little affected by a change in threshold voltage due to an irregularity in cell thickness or a temperature change.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a schematic plan view of embodiments of the ferroelectric liquid crystal device according to the present invention.

FIG. 7 is a graph showing the pre-tilt angle-dependence and the intersection angle-dependence of the contrast ratio.

DESCRIPTION OF THE PREFERRED EMBODIMENTS

Figure 1:
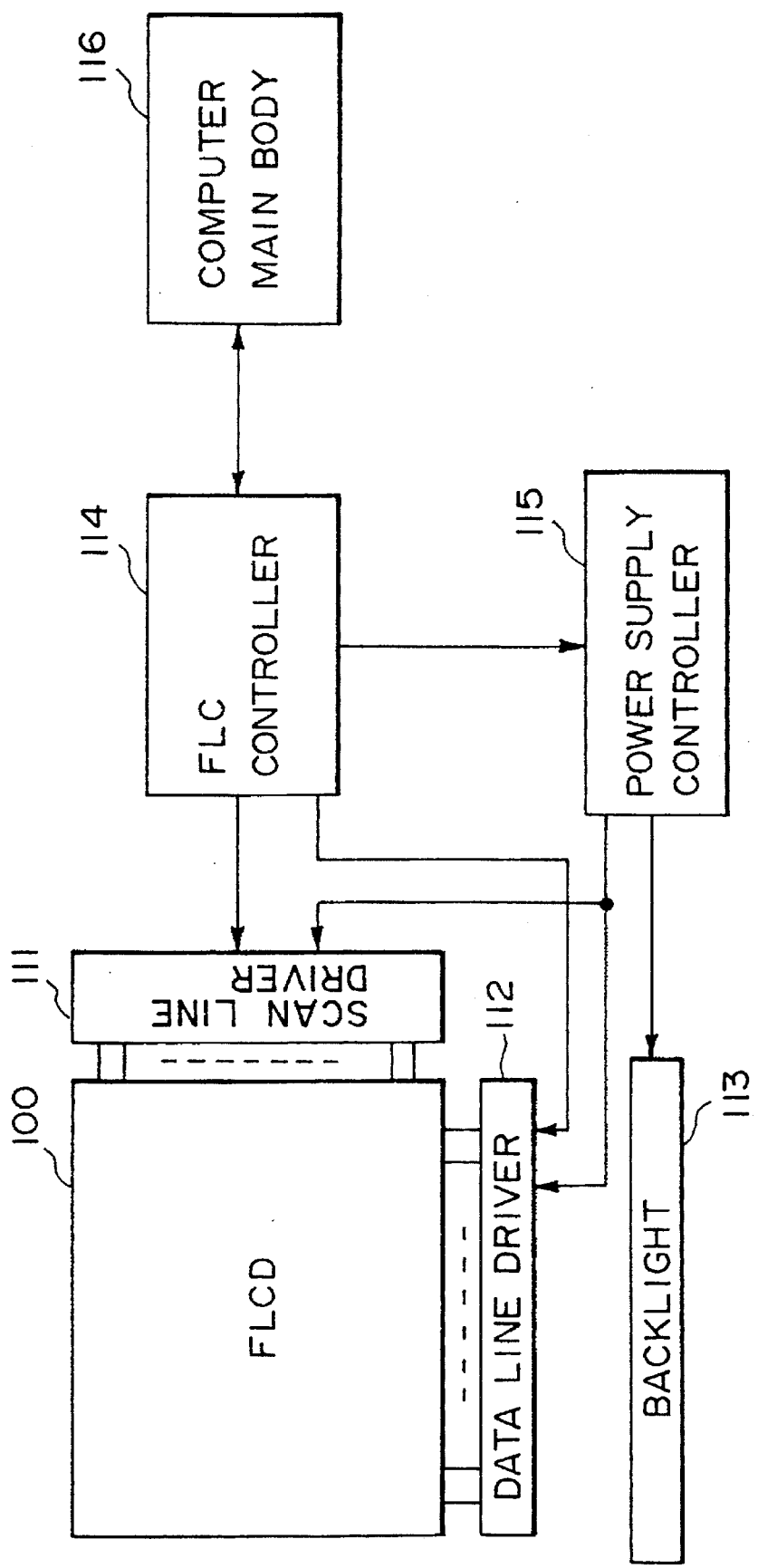
FIG. 1 is a block diagram showing a drive system for a liquid crystal device used in the present invention.
Figure 3A:
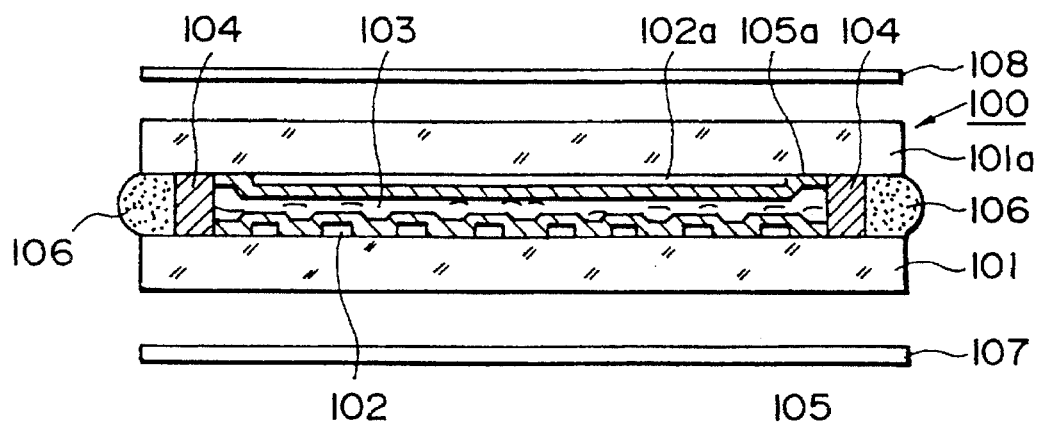
FIGS. 3A–3C are sectional views respectively taken along the line A—A in FIG. 2 showing different sectional structures of the embodiments.
Figure 3B:
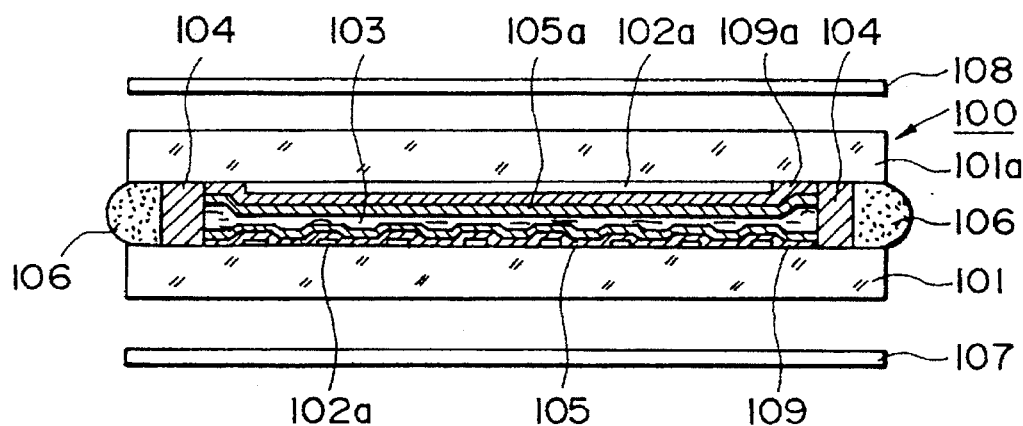
Figure 3C:
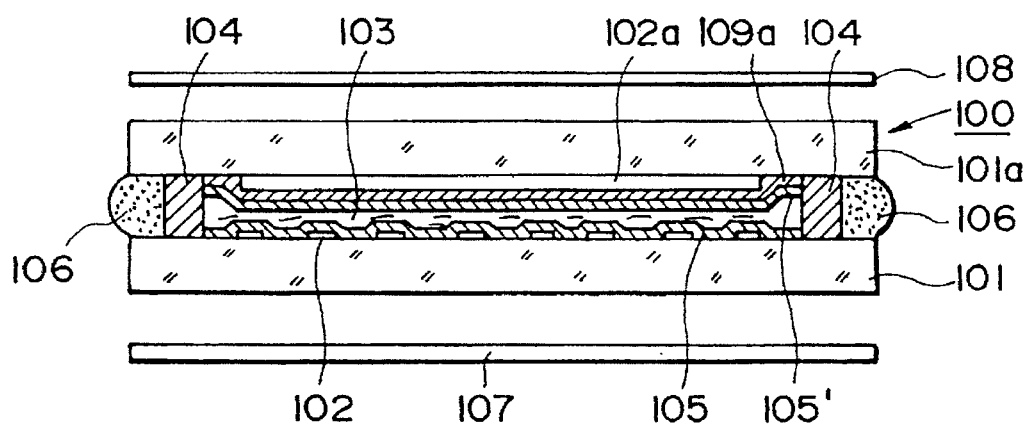

FIG. 1 is a block diagram showing a drive system for a liquid crystal device used in the present invention. FIG. 2 is a plan view common to several embodiments of the ferroelectric liquid crystal device of the present invention, and FIGS. 3A–3C are sectional views of the embodiments having different laminar structures respectively taken along the line A—A in FIG. 2.

First of all, a liquid crystal display apparatus according to the present invention is explained.

Referring to FIG. 1 showing a block diagram of a liquid crystal display apparatus according to the present invention, the apparatus includes a ferroelectric liquid crystal device 100 according to the invention, a scanning line driver 111 as a means for applying a scanning signal to the scanning lines (electrodes) based on image signals, a data line drive 112 as a means for applying data signals to data lines (electrodes) based on the image signals to drive the ferroelectric liquid crystal device 100 in combination with the scanning line driver 111, a backlight 113 as an illumination light source, an FLC controller 114 for controlling the drive of the device 100, a power supply controller 115 as a means for supplying a power to the device 100 and the backlight 113 and a computer main body 116 for controlling the entire operation of the liquid crystal display apparatus.

A cell structure 100 shown in FIGS. 2 and 3 comprises a pair of substrates 101 and 101a made of glass plates or plastic plates which are held with a predetermined gap with spacers 104 and sealed with an adhesive 106 to form a cell structure filled with a liquid crystal. On the substrate 101 is further formed an electrode group (e.g., an electrode group for applying scanning voltages of a matrix electrode structure) comprising a plurality of transparent electrodes 102 in a predetermined pattern, e.g., of a stripe pattern. On the substrate 101a is formed another electrode group (e.g., an electrode group for applying data voltages of the matrix electrode structure) comprising a plurality of transparent electrodes 102a intersecting with the transparent electrodes 102.

In the present invention, an insulating film for preventing short circuit can be formed to cover at least one side of the above-mentioned transparent electrodes 102 and 102a. In the device shown in FIG. 3A, however, such insulating films are not used so that alignment control films 105 and 105a are directly disposed over the transparent electrodes 102 and 102a formed on the substrates 101 and 101a, respectively. In the device shown in FIG. 3B, on the substrates 101 and 101a, insulating films for short circuit prevention 109 and 109a and alignment control films 105 and 105a are disposed, respectively. In the device shown in FIG. 3C, an insulating film for short circuit prevention 109a and an alignment control film 105a are formed on the substrate 101a, and an alignment control film 105 is directly disposed on the substrate 101.

Examples of the material constituting the alignment control films 105 and 105a may include inorganic insulating materials, such as silicon monoxide, silicon dioxide, aluminum oxide, zirconia, magnesium fluoride, cerium oxide, cerium fluoride, silicon nitride, silicon carbide, and boron nitride and organic insulating materials, such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin. The above-mentioned alignment (control) film of an insulating material can be also used as an insulating film for short circuit prevention. Particularly, the alignment control films 105 and 105a may preferably be formed as an inorganic insulating film which satisfactorily shows both the above-mentioned alignment control function and short circuit-preventing function. More specifically, such alignment control films 105 and 105a may for example be formed by oblique vapor deposition of an inorganic insulating material, such as SiO or $SiO_2$ onto the substrates 101 and 101a, respectively. In this instance, the direction of the resultant uniaxial alignment axis substantially coincides with the projection of the oblique vapor deposition direction onto the substrate.

Alternating, the alignment control films 105 and 105a of an inorganic insulating material or an organic insulating material may be provided with a uniaxial alignment axis by rubbing the surface of the film after formation thereof in one direction with velvet, cloth or paper to form the uniaxial alignment axis substantially coinciding with the rubbing direction.

Figure 4A:
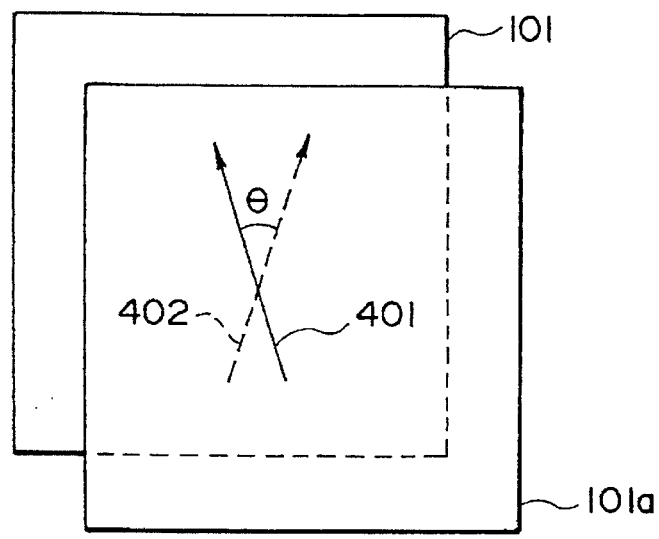
FIGS. 4A and 4B are schematic plan views each illustrating a manner of intersection of the uniaxial alignment axes provided to a pair of substrates in a liquid crystal device shown in FIG. 2.
Figure 4B:
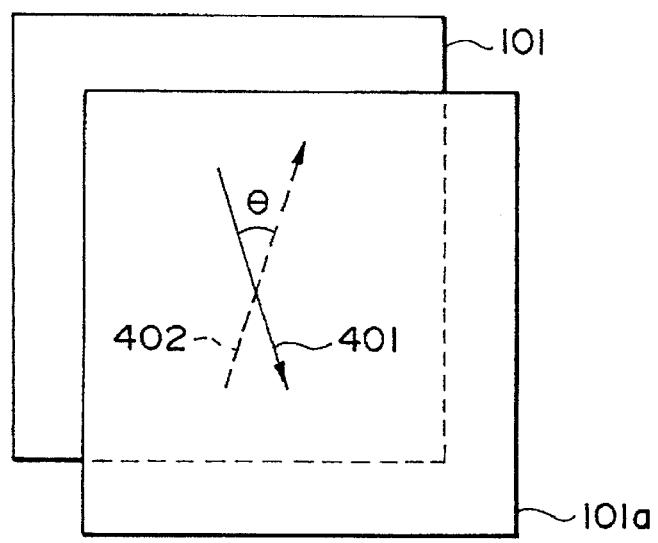
Figure 5:
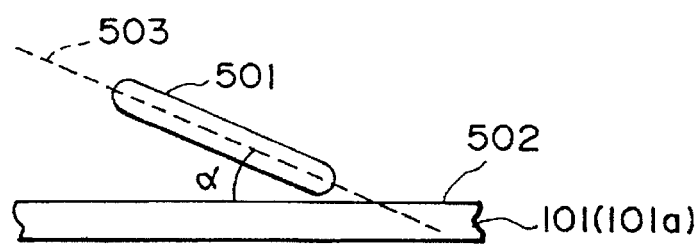
FIG. 5 is a schematic view illustrating a pre-tilt angle formed by a liquid crystal molecule against a liquid crystal aligning surface.

In this instance, as shown in FIGS. 4A and 4B, the above-mentioned uniaxial alignment axes 401 and 402 are provided to the pair of substrates 101 and 101a so as to intersect each other at an intersection angle θ. The intersection angle θ can change depending on the ferroelectric liquid crystal material and the kind of the alignment control film but may preferably be selected in the range of 2–25 degrees. On the other hand, the pre-tilt angle formed between the liquid crystal aligning surface 502 and the liquid crystal molecule 503 is selected in the range of 5 to 35 degrees.

Further, the insulating films for short circuit prevention 109 and 109a may be formed in a thickness of 200 A or larger, preferably 500 A or larger, with an inorganic insulating material, such as $SiO_2$, $TiO_2$, $Al_2O_3$, $Si_3N_4$ and $BaTiO_3$. The film formation may for example be effected by sputtering, ion beam evaporation, or calcination of an organic titanium compound, an organic silane compound, or an organic aluminum compound. The organic titanium compound may for example be an alkyl (methyl, ethyl, propyl, butyl, etc.) titanate compound, and the organic silane compound may be an ordinary silane coupling agent. In case where the thickness of the insulating films for short circuit prevention 109 and 109a is below 200 A, a sufficient short circuit prevention effect cannot be accomplished. On the other hand, if the thickness is above 5000 A, the effective voltage applied to the liquid crystal layer is decreased substantially, so that the thickness may be set to 5000 A or less, preferably 2000 A or less.

The liquid crystal material suitably used in the present invention is a chiral smectic liquid crystal showing ferroelectricity. More specifically, liquid crystals in chiral smectic C phase (SmC*), chiral smectic G phase (SmG*), chiral smectic F phase (SmF*), chiral smectic I phase (SmI*) or chiral smectic H phase (SmH*) may be used.

Details of ferroelectric liquid crystals may be disclosed in, e.g., LE JOURNAL DE PHYSIQUE LETTERS<36 (L-69) 1975, "Ferroelectric Liquid Crystals"; Applied Physics Letters 36 11, 1980, "Submicro Second Bi-stable Electrooptic Switching in Liquid Crystals"; Kotai Butsuri (Solid-State Physics) 16(141) 1981, "Ekisho (Liquid Crystals)"; U.S. Pat. Nos. 4,561,726; 4,589,996; 4,592,858; 4,596,667; 4,613,209; 4,614,609; 4,622,165, etc. Chiral smectic liquid crystals disclosed in these references can be used in the present invention.

Other specific examples of ferroelectric liquid crystal may include decyloxybenzylidene-p'-amino-2-methylbutylcinnamate (DOBAMBC), hexyloxybenzylidene-p'-amino-2-chloropropylcinnamate (HOBACPC), and 4-O(2-methyl)butylresorcylidene-4'-octylaniline (MBRA 8).

Hereinbelow, some examples of actual production are shown.

EXAMPLES 1–5

Two 1.1 mm-thick glass substrates as a pair of substrates were respectively provided with ITO stripe electrodes and then coated with a 500 A-thick insulating film of $SiO_2$ by sputtering for preventing short circuit between the electrodes on the substrates. Then, each substrate thus treated was coated with a 1.0% solution of a polyimide-forming liquid ("LQ 1802" made by Hitachi Kasei K.K.) by a spinner rotating at 3000 rpm for 30 seconds and then heated for curing at 300° C. for about 1 hour to form a 150 A-thick polyimide alignment film. The polyimide-forming liquid ("LQ 1802") was one comprising a polyimide precursor having a number-average molecular weight of 50,000 to 100,000 as measured by GPC corresponding to the molecular weights of standard polystyrenes and provided a polyimide copolymer structure containing fluorine (trifluoromethyl group) and including structural units (1) and (2) in a molar ratio of 30:70–70:30.

Then, the respective polyimide alignment films were subjected to rubbing so as to be provided with rubbing axes (uniaxial alignment axes) in a relationship as will be further explained hereinafter. Then, on one of the substrates thus treated, alumina beads having an average particle size of about 1.5 microns were dispersed, and the other substrate was superposed thereon so that their stripe electrodes intersected each other and their uniaxial alignment axes intersected each other at a prescribed angle θ as shown in FIG. 4A. Then, the two substrates were fixed to each other to form a blank cell.

The cell was then filled with a ferroelectric liquid crystal ("CS1014" (trade name), made by Chisso K.K.) under vacuum and, after sealing, the liquid crystal was gradually cooled to chiral smectic phase to be aligned. The pre-tilt angle between the director of liquid crystal molecules and the liquid crystal aligning surfaces of the thus obtained liquid crystal cell was found to be 12 degrees as measured by the crystal rotation method (Jpn. J. Appl. Phys. Vol. 19 (1980), No. 10).

The ferroelectric liquid crystal ("CS1014") showed the following phase transition series:

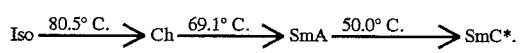

$$\text{Iso} \xrightarrow{80.5° C.} \text{Ch} \xrightarrow{69.1° C.} \text{SmA} \xrightarrow{50.0° C.} \text{SmC*}.$$

At a temperature of cholesteric phase (Ch), the liquid crystal in this example provided liquid crystal molecules forming a pre-tilt angle of inclination with respect to the substrate surfaces.

In the above described manner, 5 liquid crystal cells having intersection angles θ of 2 degrees, 5 degrees, 10 degrees, 15 degrees and 25 degrees, respectively, within the range specified by the present invention were prepared and subjected to observation of the alignment states, bistability on application of a single pulse of a sufficient voltage and measurement of contrast ratios under cross nicols, whereby the results shown in Table 1 appearing hereinafter were obtained.

Figure 9:
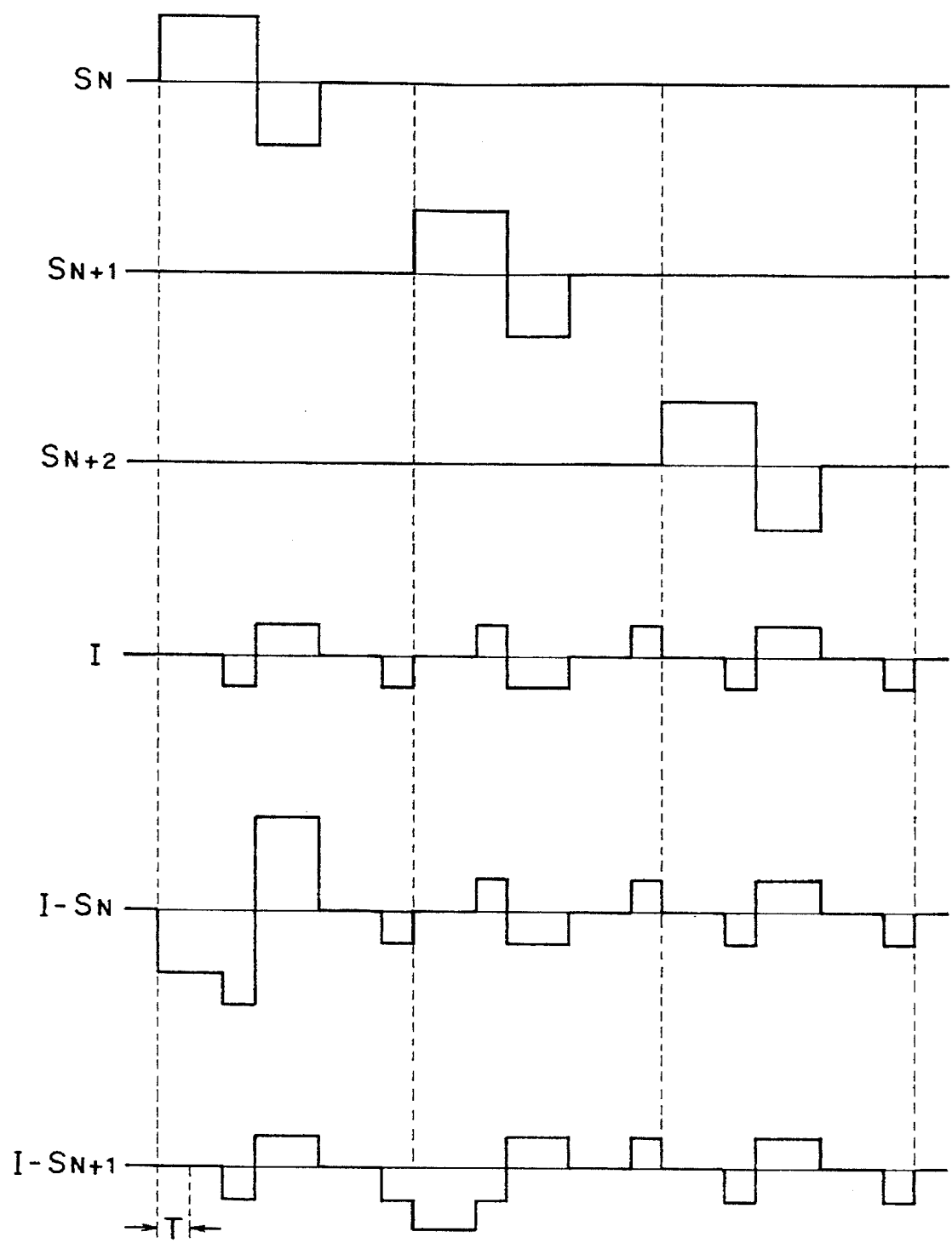
FIG. 9 is a time chart of a set of drive voltage waveforms for measuring the drive margin.

Further, the above-prepared matrix display cell was subjected to measurement of a drive margin under cross nicols by applying a set of driving waveforms shown in FIG. 9. The result is also shown in Table 1. Referring to FIG. 9, at $S_N$, $S_{N+1}$, $S_{N+2}$ . . . are shown voltage waveforms applied to the respective scanning electrodes $S_N$, $S_{N+1}$ . . . ; at I is shown a voltage waveform applied to a data electrode I; and at I–$S_N$, etc. are shown voltage waveforms applied to pixel formed at the respective intersections of the scanning electrodes $S_N$ . . . and the data electrode I.

Figure 10:
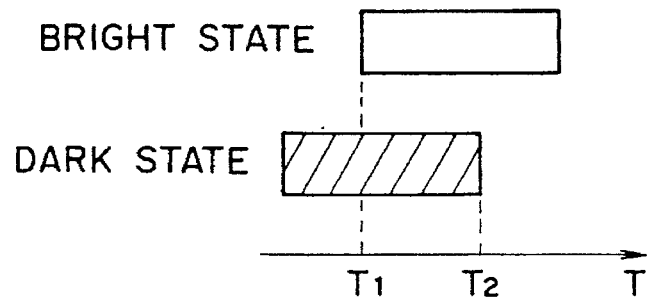
FIG. 10 is a diagram for illustrating a drive margin.

Herein, the drive margin was measured as follows. The set of driving waveforms shown in FIG. 9 are applied to a matrix cell while changing the unit pulse width T. When a bright state and a dark state are written under cross nicols within the respective ranges for T as shown in FIG. 10, with $T_1$ as the lower limit width for giving a bright state in a normal alignment state and $T_2$ as the upper limit width for giving a dark state in a normal alignment state, the drive margin is defined by $(T_2-T_1)/(T_1+T_2)$ which increases with

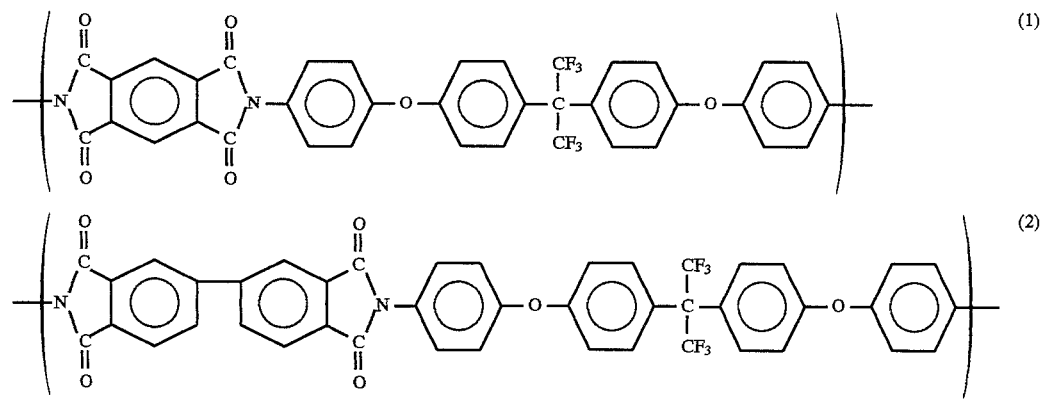

an increase in overlap of the ranges for writing both the bright and dark states and provides a measure of device performance.

Comparative Example 1

A liquid crystal cell was prepared in the same manner as in EXAMPLES 1-5 except that the intersection angle θ between the rubbing axes as set to 0 degree. The pre-tilt angle was measured to be 12 degrees. As a result of observation of the alignment state in the cell, two states including a splay alignment state giving a low contrast and a uniform alignment state giving a high contrast were found. The contrast was measured to be 10. The results are also shown in Table 1.

Figure 6:
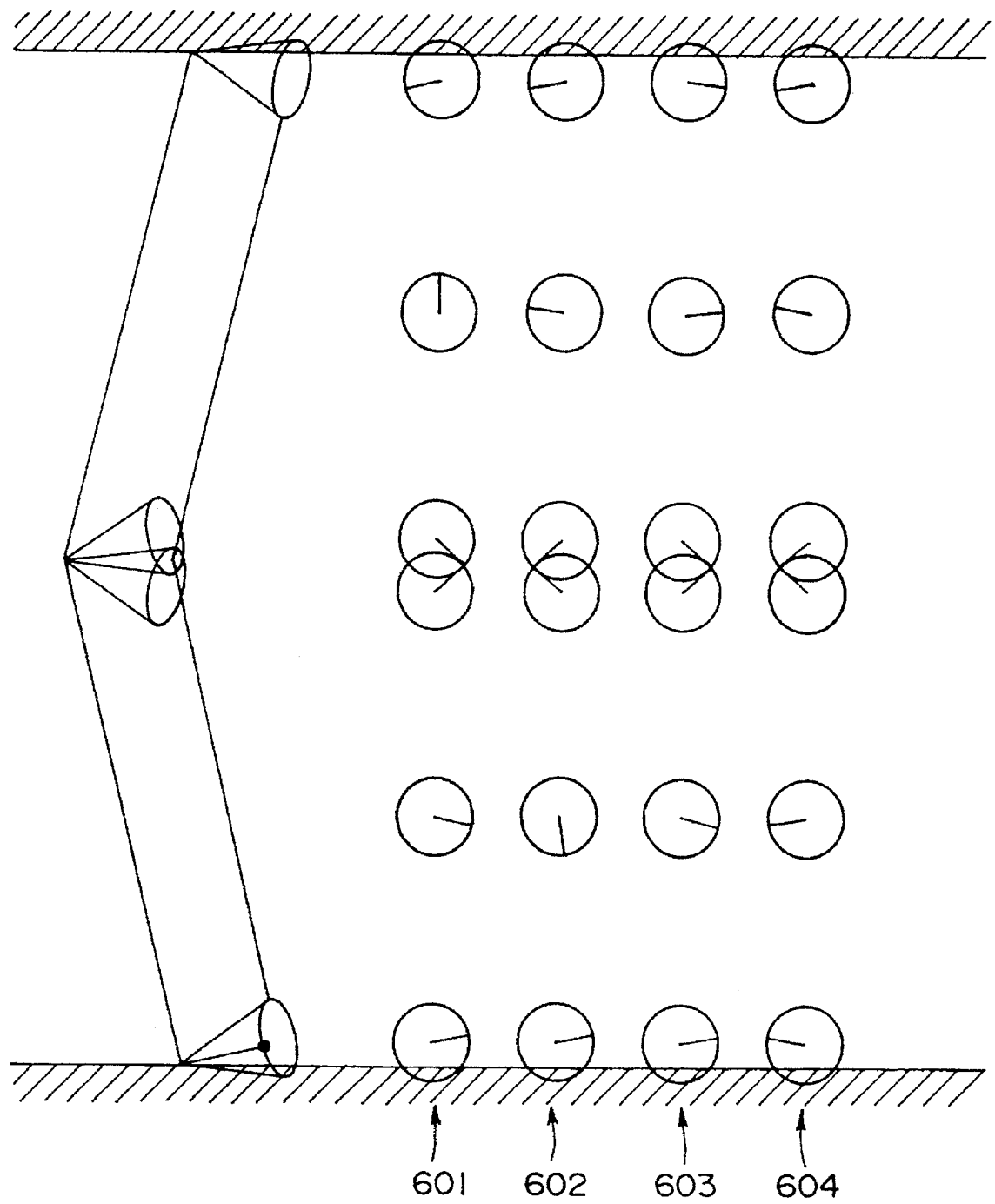
FIG. 6 is a schematic view illustrating molecular orientation axes (directors) at various points between the substrates in 4 alignment states.

FIG. 6 is a schematic view illustrating positions of directors at various points between the substrates in splay and uniform alignment states. Referring to FIG. 6, at 501–504 are respectively shown a change in director positions across the thickness, wherein a director position along a chiral smectic cone is represented by a bar projected onto the bottom (represented as a circle) of the cone as a view seen from the bottom. At 601 and 602 are shown two orientation states in the splay alignment, and at 603 and 604 are shown two orientation states in the uniform alignment.

In the cell of this comparative example, the splay alignment and the uniform alignment occurred in mixture so that the cell was supposed to fail in providing a high contrast in spite of a large pre-tilt angle of 12 degrees.

Further, when the cell was subjected to the measurement of the drive margin, the splay alignment state and the uniform alignment state were copresent at any value of T allowing switching, thus failing to allow the switching between bright and dark states in the uniform alignment state extending over the entire picture area.

Comparative Examples 2-5

Four types of liquid crystal cells respectively provided with intersection angles θ of 0 degree, 2 degrees, 10 degrees and 25 degrees were prepared in the same manner as in Examples 1-5 except that a polyimide-forming solution "LP 64" (made by Toray K.K.) was used instead of the polyimide-forming solution "LQ 1802" used in Examples 1-5. The liquid crystal cells showed a pre-tilt angle of 2.5 degrees as measured by the same method as in Examples 1-5. The contrast ratios of the cells measured respectively are shown in Table 2 appearing hereinafter.

As shown in Table 2, the liquid crystal cells having a small pre-tilt angle of 2.5 degrees did not provide a substantial increase in contrast ratio even at a certain intersection angle between the uniaxial alignment axes.

Comparative Examples 6-9

Four types of liquid crystal cells respectively provided with intersection angles θ of 0 degree, 2 degrees, 10 degrees and 25 degrees were prepared in the same manner as in Examples 1-5 except that a polyimide-forming solution "SE 100" (made by Nissan Kagaku K.K.) was used instead of the polyimide-forming solution "LQ 1802" used in Examples 1-5. The liquid crystal cells showed a pre-tilt angle of 4.0 degrees as measured by the same method as in Examples 1-5.

The contrast ratios and the drive margins of the cells were measured, whereby no uniform alignment providing a high contrast was formed but only a splay alignment state providing a low contrast was formed whereas the drive margins could be measured. The results are shown in Table 3.

EXAMPLES 6-9

Comparative Example 10

Five types of liquid crystal cells respectively provided with intersection angles θ of 0 degree, 2 degrees, 10 degrees, 15 degrees and 25 degrees were prepared in the same manner as in Examples 1-5 except that a polyimide-forming solution "RN-626"(made by Nissan Kagaku K.K.) was used instead of the polyimide-forming solution "LQ 1802" used in Examples 1-5. The liquid crystal cells showed a pre-tilt angle of 5.0 degrees as measured by the same method as in Examples 1-5. The contrast ratios of the cells measured respectively are shown in Table 4 appearing hereinafter.

In the cell of Comparative Example 10 with an intersection angle θ of 0 degree, the above-mentioned splay alignment and uniform alignment occurred in mixture, so that a substantial improvement in contrast was not attained. On the other hand, in the cells of Examples 6-9, a uniform alignment was formed to provide a substantially improved contrast.

EXAMPLES 10-14

Five types of liquid crystal cells respectively provided with intersection angles θ of 2 degrees, 5 degrees, 10 degrees, 15 degrees and 25 degrees were prepared in the same manner as in Examples 1-5 except that the uniaxial alignment axes provided to each pair of substrates were reverse to each other as shown in FIG. 4B. The liquid crystal cells showed a pre-tilt angle of 8.5 degrees. The contrast ratios of the cells measured respectively under cross nicols are shown in Table 5 appearing hereinafter.

EXAMPLES 15-19

Four types of liquid crystal cells respectively provided with intersection angles θ of 2 degree, 5 degrees, 10 degrees, 20 degrees and 25 degrees were prepared in the same manner as in Examples 1-5 except that a ferroelectric liquid crystal "CS1011" (trade name, made by Chisso K.K.) was used instead of the ferroelectric liquid crystal "CS1014" (trade name, made by Chisso K.K.) used in Examples 1-5. The liquid crystal cells showed a pre-tilt angle of 10.5 degrees. The contrast ratios of the cells measured respectively are shown in Table 6 appearing hereinafter.

TABLE 1

| | (α = 12 degrees) | | | | | |
| --- | --- | --- | --- | --- | --- | --- |
| | Ex. 1 | Ex. 2 | Ex. 3 | Ex. 4 | Ex. 5 | Comp. Ex. 1 |
| Θ (deg.) | 2 | 5 | 10 | 15 | 25 | 0 |
| Alignment state | Not defect | → | → | → | → | Defect of spaly alignment |

TABLE 1-continued ($\alpha$ = 12 degrees)

|  | Ex. 1 | Ex. 2 | Ex. 3 | Ex. 4 | Ex. 5 | Comp. Ex. 1 |
|---|---|---|---|---|---|---|
| Bistability | All region inverted | → | → | → | → | |
| Contrast ratio | 30 | 50 | 45 | 40 | 26 | 10 |
| Drive margin | 0.30 | 0.41 | 0.56 | 0.45 | 0.34 | — |

TABLE 2

($\alpha$ = 2.5 degrees)

| Comparative Example No. | 2 | 3 | 4 | 5 |
|---|---|---|---|---|
| $\Theta$ (deg.) | 0 | 2 | 10 | 25 |
| Contrast ratio | 8.0 | 8.6 | 8.7 | 8.4 |

TABLE 3

($\alpha$ = 4.0 degrees)

| Comparative Example No. | 6 | 7 | 8 | 9 |
|---|---|---|---|---|
| $\Theta$ (deg.) | 0 | 2 | 10 | 25 |
| Contrast ratio | 8.1 | 8.0 | 8.3 | 8.2 |
| Drive margin | 0.21 | 0.20 | 0.19 | 0.20 |

TABLE 4

($\alpha$ = 5.0 degrees)

|  | Comp. Ex. 10 | Ex. 6 | Ex. 7 | Ex. 8 | Ex. 9 |
|---|---|---|---|---|---|
| $\Theta$ (deg.) | 0 | 2 | 10 | 15 | 25 |
| Contrast ratio | 9.5 | 21 | 30 | 28 | 12 |

TABLE 5

($\alpha$ = 8.5 degrees)

| Ex. No. | 10 | 11 | 12 | 13 | 14 |
|---|---|---|---|---|---|
| 0 (deg.) | 2 | 5 | 10 | 15 | 25 |
| Contrast ratio | 18 | 30 | 28 | 24 | 10 |

TABLE 6

($\alpha$ = 10.5 degrees)

| Ex. No. | 15 | 16 | 17 | 18 | 19 |
|---|---|---|---|---|---|
| 0 (deg.) | 2 | 5 | 10 | 20 | 25 |
| Contrast ratio | 20 | 36 | 40 | 18 | 10 |

The experimental data shown in Tables 1–6 above are summarized in a graph of FIG. 7 wherein the contrast ratio data are plotted versus the intersection data for various pre-tilt angles α as parameters. Thus, FIG. 7 shows the dependence of the contrast ratio C/R on both the intersection angle θ and the pre-tilt angle α.

As is understood from the graph, there is a remarkable difference in intersection angle θ-dependence of the contrast ratio between the cases of the pre-tilt angle being below 5.0 degrees and the cases of the pre-tilt angle being 5.0 degrees or larger. Further, in the case of the intersection angle θ being 0 degree, the increase in pre-tilt angle α does not provide a substantial improvement in contrast ratio. Thus, in order to improve the contrast ratio, it is important to optimize both parameters, i.e., the pre-tilt angle u and the intersection angle θ between the alignment axes.

Figure 8:
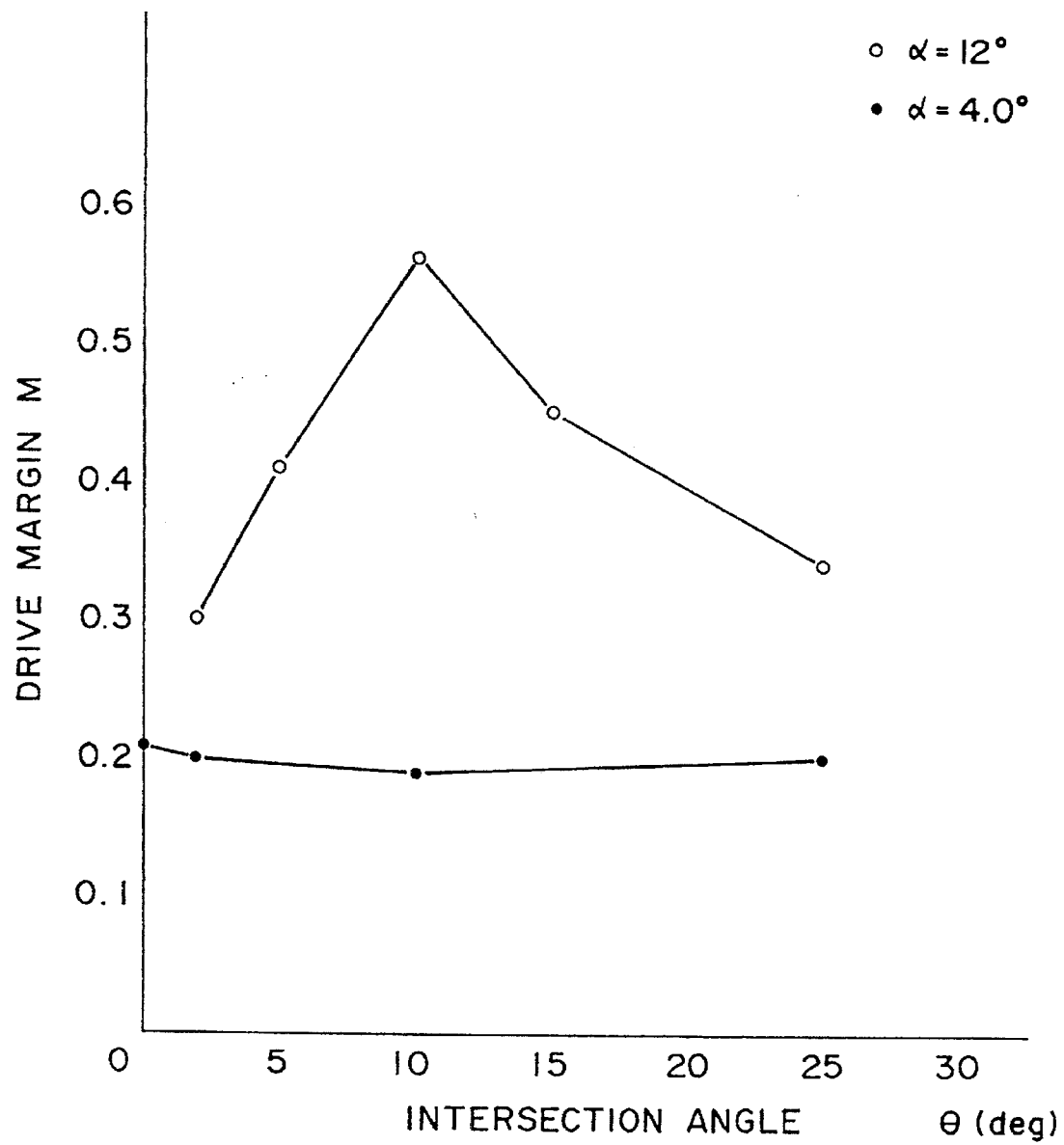
FIG. 8 is a graph showing the intersection angle-dependence and the pre-tilt angle-dependence of the drive margin.

The drive margin data given in Tables 1 and 3 are inclusively shown in FIG. 8, from which it will be understood that the tilt angle α and the intersection angle θ within the range of the present invention provided a large drive margin, thus allowing a bright-dark display over wide driving conditions.

Figure 11:
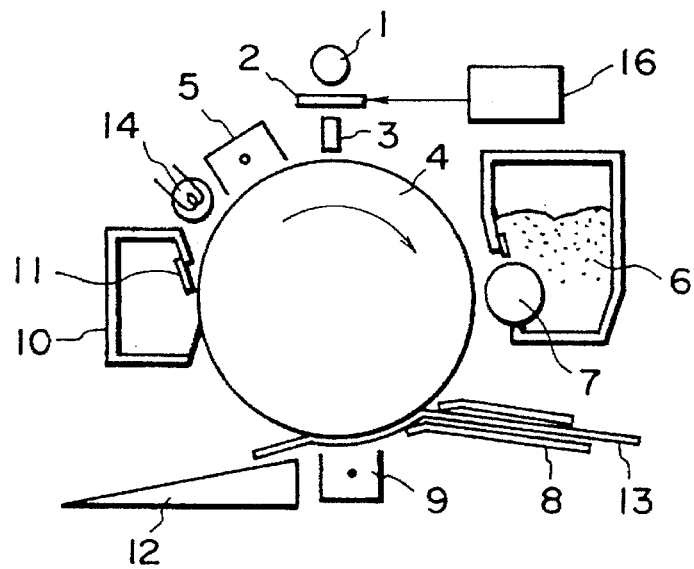
FIGS. 11 and 12 are views showing an embodiment of the liquid crystal device according to the invention applied to an image forming apparatus.
Figure 12:
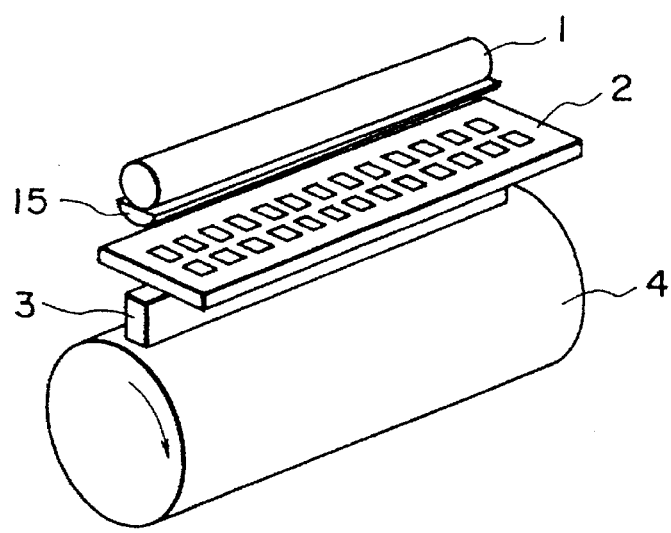

Next, the application of the above-mentioned liquid crystal device to an image-forming apparatus will be explained with reference to FIG. 11 which shows an electrophotographic image forming apparatus using the above liquid crystal device as a liquid crystal shutter for modulating and controlling a quantity of light to which a photosensitive member is exposed. FIG. 12 is an enlarged perspective view showing some vital parts of the apparatus. Referring to FIGS. 11 and 12, the image-forming apparatus includes: an exposure lamp 1 as a light source, a liquid crystal shutter 2 of the type described above including a pair of polarizers (not specifically shown), a short-focus image forming element array 3, a photosensitive drum 4, a charger 5, a developing device 6, a developing sleeve 7, a transfer sheet guide 8, a transfer charger 9, a cleaning device 10, a cleaning blade 11, and a sheet-conveying guide. Referring to the figures, the photosensitive member 4 rotating in the direction of an arrow is first charged by a charger 5. Then, the photosensitive drum is illuminated with light which has been modulated depending on image data to form an electrostatic latent image thereon. As is better shown in FIG. 12, the light modulation is effected by selectively interrupting or transmitting the light from the exposure lamp 1 through the liquid crystal shutter 2 in which the shutter elements are disposed in an array generally arranged along the axis of the photosensitive member 4. The shutter elements are disposed in a staggered fashion as shown so as to increase the density of the arrangement. In order to condense the light from the exposure lamp onto the liquid crystal shutter, it is possible to dispose a rod lens 15 as shown in FIG. 12.

The thus formed electrostatic latent image is developed by attachment of a toner charged on the developing sleeve. The toner image formed on the photosensitive drum 4 is transferred onto a transfer sheet 13 supplied from a paper-supply cassette (not shown) under discharge by the transfer charger 9 from the backside of the transfer sheet 13. The toner image on the transfer sheet 13 is then fixed by a fixing device (not shown). On the other hand, a portion of the toner remaining unused on the photosensitive drum is scraped off from the drum surface by the cleaning blade 11 to be recovered in the cleaning device 10. Further, the electric charge remaining on the photosensitive drum is extinguished by illumination with the pre-exposure lamp 14.

As described hereinabove, according to the present invention, there is provided a liquid crystal device comprising a ferroelectric liquid crystal disposed between a pair of substrates each provided with a uniaxial alignment axis, wherein the uniaxial alignment axes are disposed to intersect each other at a prescribed intersection angle and the pre-tilt angle between the liquid crystal molecules and the liquid crystal aligning surfaces is set to 5–35 degrees, whereby a good alignment characteristic is attained to provide an increased contrast ratio and also an increased drive margin is provided to allow a bright-dark display under wide driving conditions.

What is claimed is:

1. A chiral smectic liquid crystal device, comprising:

a pair of substrates and a chiral smectic liquid crystal disposed between said substrates, each substrate having thereon (i) a group of electrodes for driving said chiral smectic liquid crystal and (ii) a rubbed organic alignment film forming a liquid crystal aligning surface of the substrate and provided with a uniaxial alignment axis which intersect each other at an intersection angle of 2–25 degrees;

said chiral smectic liquid crystal forming a plurality of smectic layers each composed of plural liquid crystal molecules, each smectic layer being inclined to form angles with respect to the normal of the respective adjacent substrates so as to be bent between the substrates, wherein molecules of said liquid crystal are aligned to provide a director forming a pre-tilt angle of 5–35 degrees with the liquid crystal aligning surfaces of said substrates, and the molecules being placed in a uniform alignment state characterized by symmetrical cone bottom-projected director positions for a first and a second orientation state thereof on both substrates.

2. A device according to claim 1, wherein said intersection angle is 2–15 degrees.

3. A device according to claim 1, wherein said intersection angle is 5–15 degrees.

4. A liquid crystal display device, including:

a liquid crystal device according to claim 1, image signal generating means for driving said liquid crystal device and a light source.

5. A liquid crystal display apparatus including a liquid crystal display device according to claim 4, means for controlling said image signal generating means and means for controlling power supply to said liquid crystal display device.

6. A recording apparatus, including:

a liquid crystal device according to claim 1, image signal generating means for driving said liquid crystal device, a photosensitive member and a developing device.

* * * * *

UNITED STATES PATENT AND TRADEMARK OFFICE
CERTIFICATE OF CORRECTION

PATENT NO. : 5,646,704
DATED : July 8, 1997
INVENTOR(S) : YASUTO KODERA

Page 1 of 3

It is certified that error appears in the above-identified patent and that said Letters Patent is hereby corrected as shown below:

Title page,

AT [56] REFERENCES CITED

FOREIGN PATENT DOCUMENTS

"2004224" should read --2-04224--.

OTHER PUBLICATIONS

After "Scheuble", "(9189)" should read --(1989)--.

IN THE DRAWINGS

SHEET 6 OF 9, FIGURE 7

"INTERECTION" should read --INTERSECTION--.

COLUMN 1

Line 48, "an" should read --a--.

COLUMN 2

Line 2, "entirely" should read --entirety--; and
Line 16, "improved," should read
    --improved characteristic,--.

COLUMN 4

Line 11, "nitride" should read --nitride;--; and
Line 30, "Alternating," should read --Alternatively,--; and
Line 44, "angle" should read --angle $\alpha$--.

UNITED STATES PATENT AND TRADEMARK OFFICE
CERTIFICATE OF CORRECTION

PATENT NO. : 5,646,704

DATED : July 8, 1997

INVENTOR(S) : YASUTO KODERA

It is certified that error appears in the above-identified patent and that said Letters Patent is hereby corrected as shown below:

COLUMN 5

Line 6, "<36" should read --Vol. 36--; and
    Line 19, "4-0(2-" should read --4-0-(2- --.

COLUMN 6

Line 38, "pixel" should read --pixels--.

COLUMN 7

Line 27, "supposed" should read --disposed--.

COLUMN 8

Line 48, "2 degree," should read --2 degrees,--; and
    Table 1, "spaly" should read --splay--.

COLUMN 9

Table 5, "0 (deg.)" should read --$\Theta$ (deg.)--; and
    Table 6, "0 (deg.)" should read --$\Theta$ (deg.)--.

COLUMN 10

Line 24, "angle u" should read --angle $\alpha$--.

UNITED STATES PATENT AND TRADEMARK OFFICE
CERTIFICATE OF CORRECTION

PATENT NO. : 5,646,704

DATED : July 8, 1997

INVENTOR(S) : YASUTO KODERA

It is certified that error appears in the above-identified patent and that said Letters Patent is hereby corrected as shown below:

COLUMN 12

Line 20, "including" should read --including:--.

Signed and Sealed this

Twenty-second Day of September, 1998

Attest:

BRUCE LEHMAN

Attesting Officer

Commissioner of Patents and Trademarks